United States Patent
Taff et al.

(10) Patent No.: US 6,845,152 B2
(45) Date of Patent: Jan. 18, 2005

(54) SYSTEM AND METHOD TO STOP CALL LOOPING

(75) Inventors: Louis Taff, Chapel Hill, NC (US); Hans Nordin, Tullinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 132 days.

(21) Appl. No.: 10/402,511

(22) Filed: Mar. 28, 2003

(65) Prior Publication Data

US 2004/0190705 A1 Sep. 30, 2004

(51) Int. Cl.[7] .............................................. H04M 3/42
(52) U.S. Cl. .............................. 379/211.02; 379/211.04
(58) Field of Search ........................ 379/211.02, 211.04

(56) References Cited

U.S. PATENT DOCUMENTS

| 5,018,194 | A |   | 5/1991  | Suzuki et al. |           |
|-----------|---|---|---------|---------------|-----------|
| 5,982,870 | A |   | 11/1999 | Pershan et al.|           |
| 6,167,256 | A |   | 12/2000 | Ylä-Outinen et al. |      |
| 6,418,212 | B1| * | 7/2002  | Harrison et al. | ......... 379/189 |

FOREIGN PATENT DOCUMENTS

| EP | 0749 228 A2 | 12/1996 |
| WO | WO 00/62557 | 10/2000 |

OTHER PUBLICATIONS

"Re: Is Concurrent Call Forwarding Possible?" Brian Kantor; comp.dcom.telecom; Apr. 7, 1996. (1 pg).
"Re: Numer of Simultaneous Forwarded Calls" Al Varney; AT&T Network Systems; Mar. 9, 1993. (3 pgs).
White Paper—"Mobile Advantage Wireless Assistant" 2002 Ericsson Inc. (14 pages).

* cited by examiner

Primary Examiner—Creighton Smith

(57) ABSTRACT

A system to stop call looping in a communications network comprises a switch to receive incoming calls, a server operatively connected to the switch, and a call control function running on the server. The call control function is programmed to determine if incoming calls, received at the switch and directed to a called number, are possible looped calls. If the call control function determines that a given incoming call is a possible looped call of a previous call, then it delays the forwarding of the incoming call to the called number.

26 Claims, 5 Drawing Sheets

SYSTEM AND METHOD TO STOP CALL LOOPING

BACKGROUND OF THE INVENTION

The present invention relates generally to communications networks, and in particular, to communications networks that employ methods to control call looping.

Communications networks often include a variety of subscriber services, such as call forwarding. Although these services offer convenience to subscribers, they also introduce some complexities for service providers. For example, call-forwarding can result in "call looping." Call looping occurs when a call is forwarded multiple times between endpoints without terminating, and results in wasted resources and trunk congestion. By way of example, consider the situation where the subscriber mistakenly configures his/her service profile such that all incoming calls to his/her mobile number are forwarded unconditionally to his/her landline number, and all incoming calls into his/her landline number are forwarded unconditionally to his/her mobile number. A looped call may occur when a caller dials either number. In these situations, the incoming call merely bounces back and forth between the mobile network and the landline network.

There have been past attempts at detecting and preventing call looping. One method is to impose a hard limit at the switch that specifies the maximum number of simultaneous forwarded calls. Other methods examine message data to detect looped calls. These methods have not been completely successful at eradicating call looping, and further, do not adequately address the question of wasted resources. Moreover, service providers cannot always rely upon the validity of the message data for comparison. Thus, these methods may result in the caller becoming frustrated and the subscriber may never be aware that a problem exists. Accordingly, there is a need for an improved system and method of detecting and preventing call looping in communications networks.

SUMMARY OF THE INVENTION

A system and method to prevent call looping in a communications network comprises a switch to receive incoming calls, a server operatively connected to the switch, and a call control function running on the server. The call control function is programmed to determine if incoming calls, received at the switch and directed to a called number, are possible looped calls. If the call control function determines that a given incoming call is a possible looped call of a previously received call currently being processed, then it deliberately delays the forwarding of the incoming call to the called number. The delay is long enough to ensure that any previous unanswered calls to the same called number terminate before the incoming call is forwarded. If the delayed call is a looped call, then it will be terminated when the original unanswered call is terminated. If the delayed call is not a looped call, it will be processed at the end of the predetermined delay period.

DETAILED DESCRIPTION OF THE INVENTION

Figure 1:
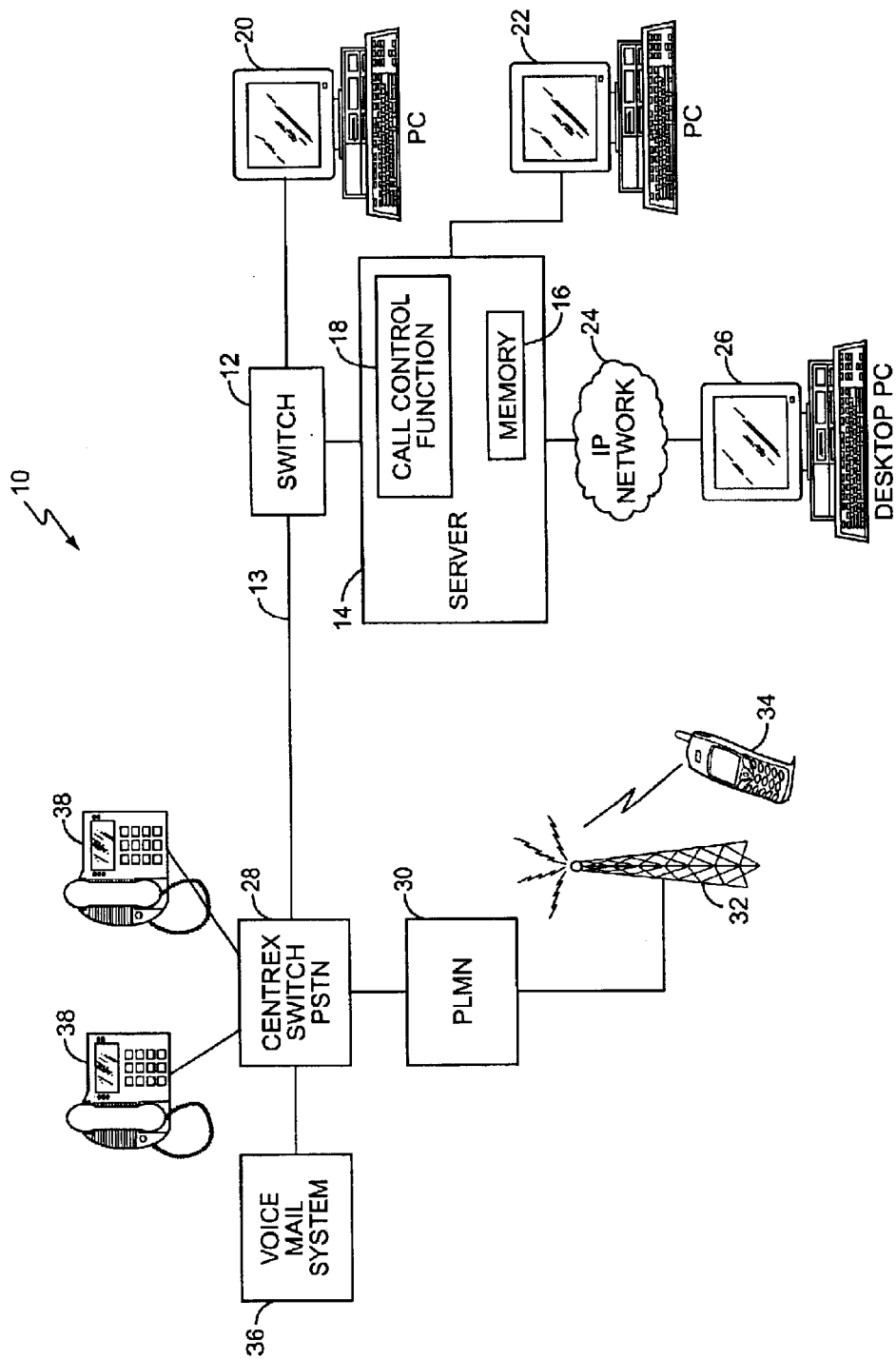
FIG. 1 illustrates a possible configuration of a communications network according to one embodiment of the present invention.

Referring now to FIG. 1, an exemplary communications network that employs the loop-stopper functionality of the present invention is shown therein and indicated generally by the number 10. Network 10 comprises a switch 12 and a server 14. In one embodiment, switch 12, server 14, and their associated functionality are part of customer premises equipment. However, it should be understood that the loop stopper functionality of the present invention is not limited to use in customer premises equipment, and may in fact be used in both private and public networks.

End users may communicate with server 14 via an Ethernet connection, such as over Local Area Network (LAN) 24, using a desktop computer 26. Provisioning computers 20 and 22 operatively connect to switch 12 and server 14. Provisioning computers 20 and 22 are used by systems operators, for example, to provision services and data, and/or monitor the operation of switch 12 and server 14. Although FIG. 1 shows computers 20, 22 as separate entities, those skilled in the art will realize that this is not required. Computers 20, 22 may or may not be a single computer, and further, may connect to switch 12 and server 14 directly, or over a network.

Switch 12 connects to another switch, such as Centrex Switch 28, in the Public Switched Telephone Network (PSTN) via T1/E1/PRI lines (13). A plurality of landline telephones 38 may connect to the Centrex Switch 28, as does a voice mail system 36 and a Public Land Mobile Network (PLMN) 30. One or more cell sites 32 within the PLMN 30 permit wireless users to communicate using a mobile terminal 34 or similar wireless enabled device. Both the PSTN and the PLMN 30 are well-known communications networks, and as such, are not described in detail. However, the loop-stopper functionality of the present invention is able to handle multiple types of calls from a variety of interconnected communications networks.

Server 14 can be any computing device known in the art, and may comprise one or more microprocessors (not shown), hard drives (not shown), and/or CD-ROM drives (not shown). Further, server 14 includes functionality typically included on telecommunications servers, such as operating system, memory management, and fault tolerance, as well as applications for providing subscriber services, for example, call-forwarding, call-detail recording, and one-number type services. A call control function 18 stored in memory 16 communicates with switch 12 such that call-control function 18 processes both incoming and outgoing calls.

Figure 2:
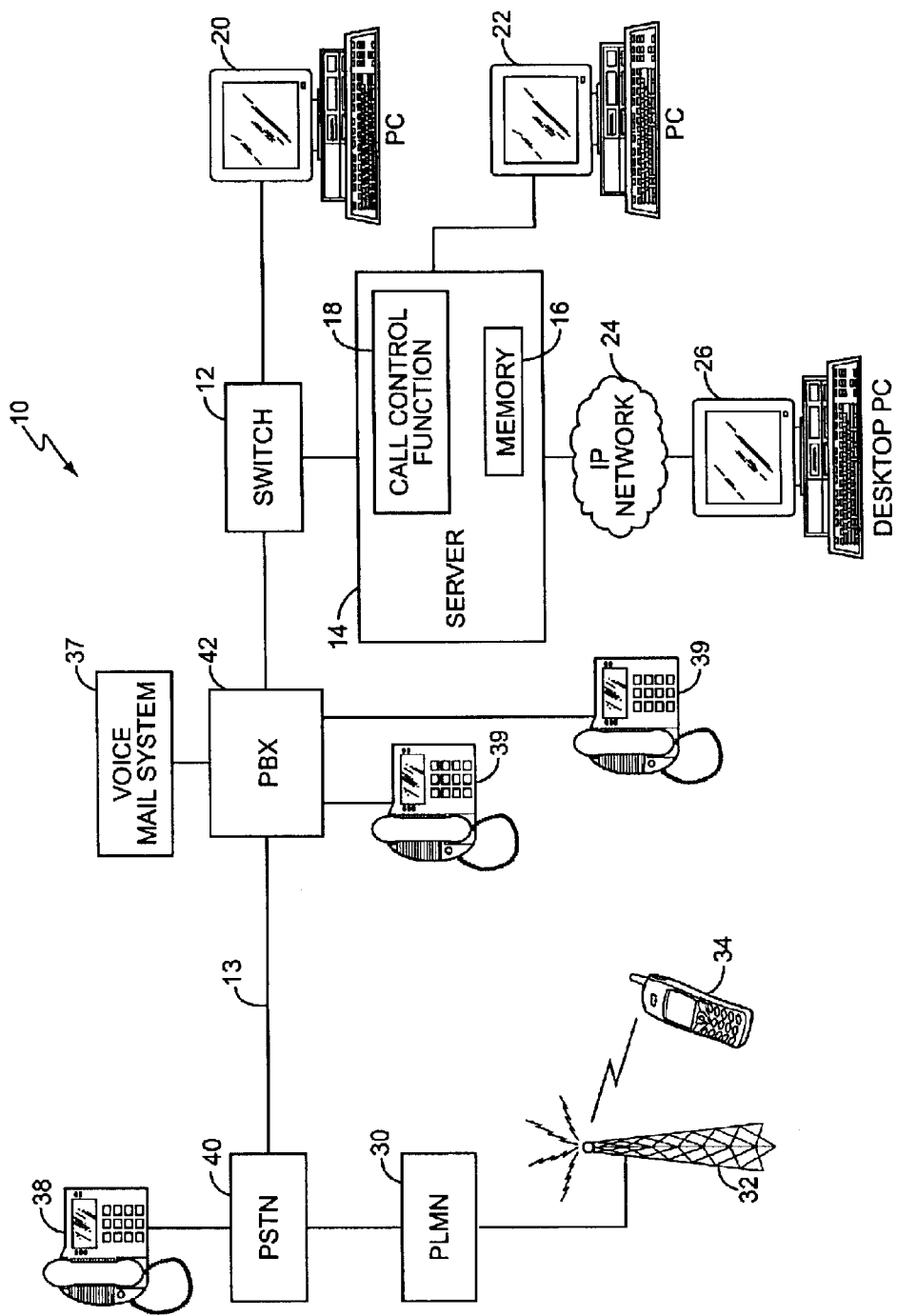
FIG. 2 illustrates an alternate configuration of a communications network according to one embodiment of the present invention.

An alternative configuration of network 10 is shown in FIG. 2. In this configuration, a Private Branch Exchange (PBX) 42 is operatively disposed between switch 12 and PSTN 40, and may connect to one or more landline telephones 39. Additionally, PBX 42 connects subscribers to voice mail system 37. As in the network configuration of FIG. 1, system personnel can provision and/or maintain switch 12 and server 14 using computers 20, 22, while end-users may communicate with server 14 using computer 26 via LAN 24. Of course, PSTN 40 and PLMN 30 are interconnected, thereby permitting wireless subscribers using mobile telephone 34 and cell site 32 to communicate with subscribers using landline telephones 38, 39.

Although not specifically shown in the Figures, the present invention also contemplates the interconnection of other networks as well. For example, private wireless networks and satellite networks are just two types of networks that may enjoy the benefits offered by the present invention. In fact, the present invention may be employed in any network susceptible to the possibility of call looping. Whatever the type of network or network configuration used, however, call control function 18 communicates with switch 12 to process both incoming and outgoing calls.

Some prior art systems have attempted to prevent call looping by setting a maximum limit on the number of calls that a given switch may forward to a called number, or by imposing certain restrictions on subscribers at provisioning time. Still other systems examine message data associated with incoming calls and data associated with on-going calls to try to detect and positively identify looped calls. While they have met with some success, these methods have not adequately addressed the problem of network congestion, and have often required complex coding in order to detect a looped call. Further, these methods may forward a call whether or not it is a looped call. Thus, these systems are limited in their abilities.

Figure 3:
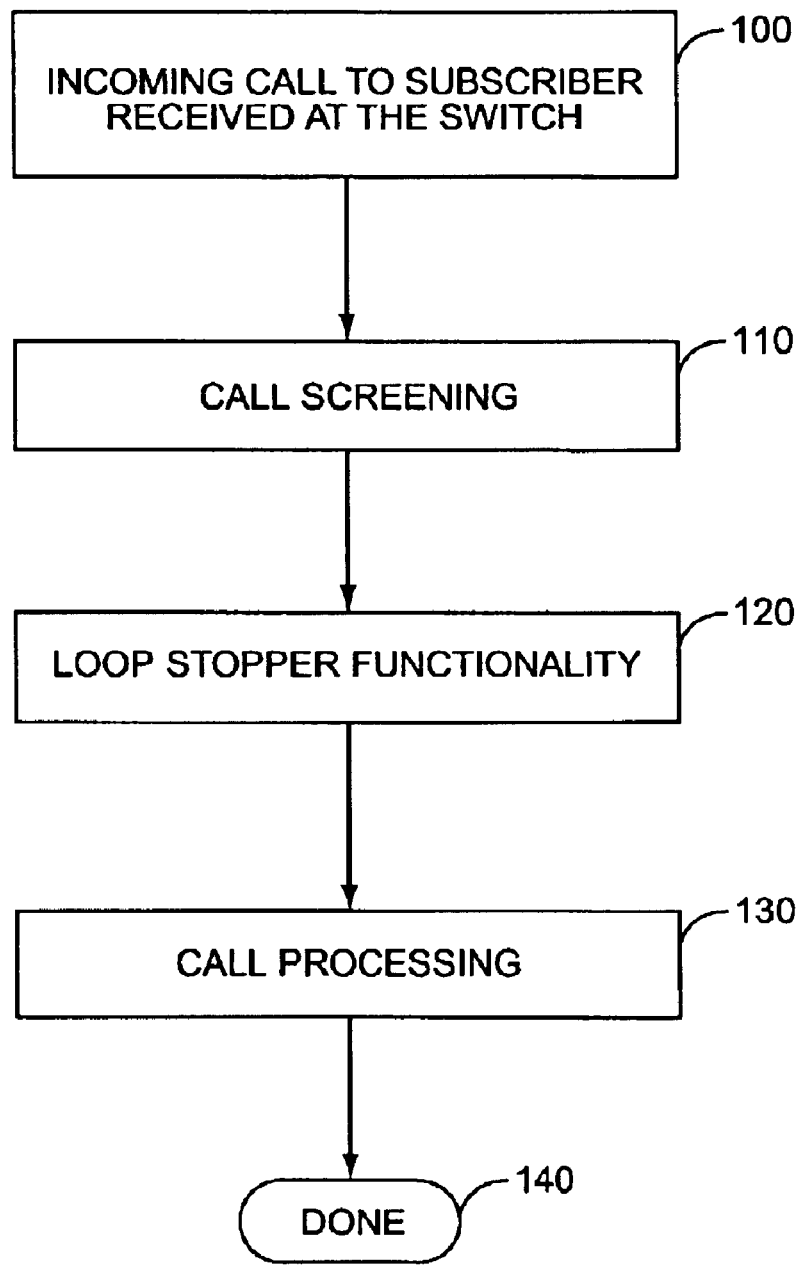
FIG. 3 illustrates a broad overview of a typical call flow.

The call-control function 18 of the present invention is designed to prevent call looping in communications networks by not immediately forwarding a call. This approach is more passive than those of the prior art. To illustrate this approach, an exemplary call flow using the loop-stopper functionality is shown in FIG. 3. It should be noted that the loop-stopper functionality described herein is provided by the call-control function 18, and thus, the terms may be used interchangeably.

The method shown in FIG. 3 begins with an incoming call received at switch 12 (box 100). Optionally, various types of call screening (box 110) may be employed by some systems as a "cut-off" to prevent unnecessary call processing. Other types of call processing, such as call detail recording, may also be executed here, if so desired. It should be understood, however, that call screening and call detailing functionality are not part of the present invention, and thus, are not described in any detail. They are shown in the Figures merely to illustrate some of the functionality that may be used in conjunction with the present invention.

Once the call is received and any optional functionality performed, the call passes to the loop-stopper functionality of the present invention (box 120). Here, the call control function 18 on server 14 will attempt to detect and prevent call looping using a process that is described later in more detail below. However, it is sufficient to note that the incoming call received by switch 12 will either continue to be processed (box 130) by additional call functionality, or will have been terminated, after the loop-stopper functionality is complete. In any case, the present invention prevents the incoming call from continuously looping throughout the network, and thus, saves valuable network resources.

Figure 4A:
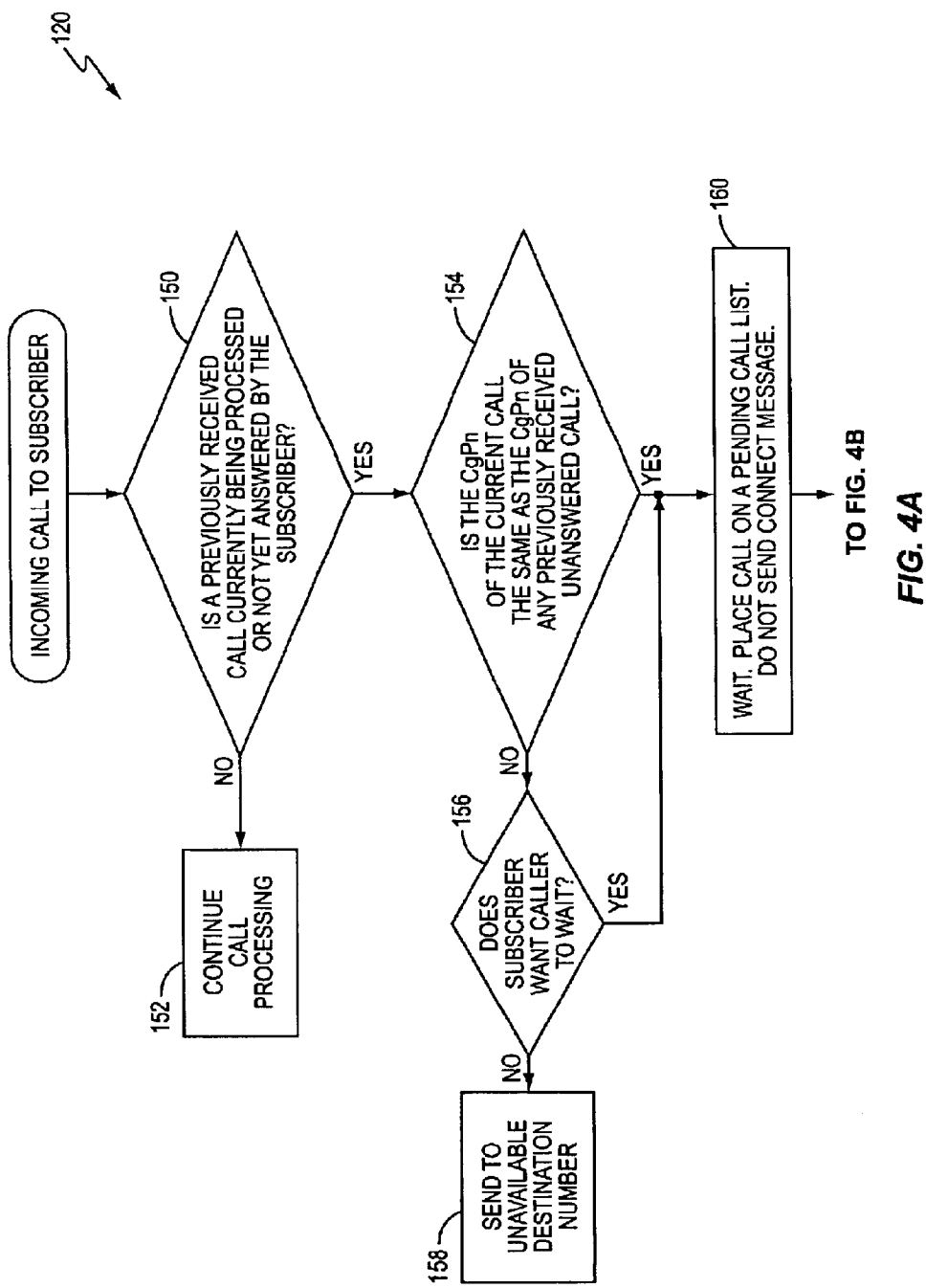
FIGS. 4A–4B illustrate in more detail the method of one embodiment of the present invention.
Figure 4B:
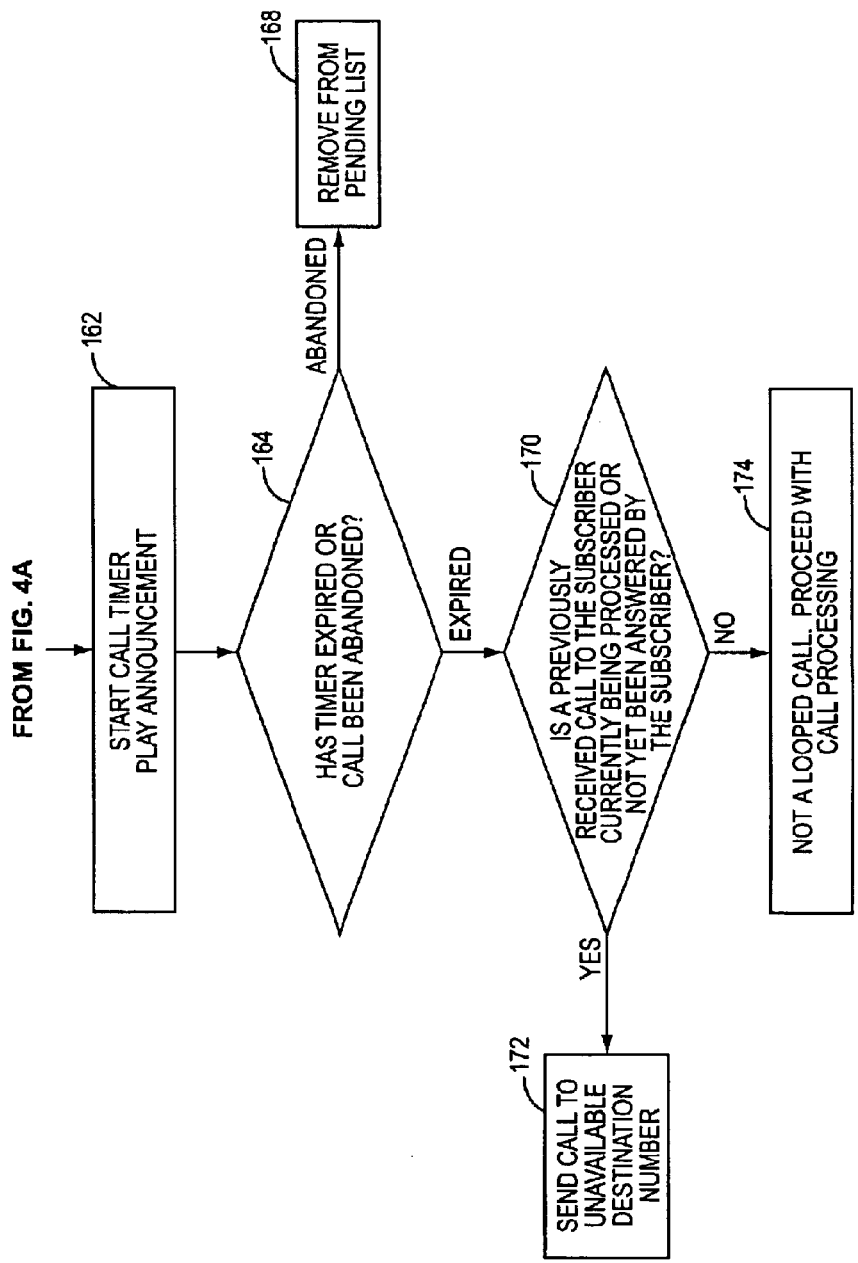

FIGS. 4A–4B illustrate one possible embodiment of the loop-stopper functionality 120 of the present invention. Upon receiving the incoming call, call control function 18 will attempt to determine if a previously received call to the same called number is currently being processed, or has not yet been answered by the subscriber (box 150). If there are no previously received calls to the same called number being processed, or if there are no previous calls not yet answered by the subscriber, then the procedure will return to normal call processing (box 152). Otherwise, the call control function 18 may compare the calling party number of the current incoming call with the calling party numbers of any previous calls still waiting for the subscriber (box 154).

If the calling party number information does not match any of the previously received calls waiting for the subscriber, then an optional "wait" announcement can be played to the caller (box 156), if the subscriber wants the caller to wait. The incoming call is then placed in a pending call list (box 160). However, if the subscriber does not want the caller to wait, the incoming call is sent to a destination number to which calls are sent when the subscriber is unavailable (box 158). This type of "unavailable" destination number may be provisioned by the subscriber, and preferably rings a destination that will not forward the call. That is, once the call is received at the "unavailable" destination number, it is either answered or terminated. One example of this type of destination number is voice mail.

It should be noted that step 154 is optional. While this step may provide some measure of protection against looped calls, its implementation may be complex, and is dependent on call parameter data received with the incoming call message. As stated above, some networks may not propagate the expected calling party number information from message to message, or the calling party information may contain the information for a trunk line as opposed to a subscriber line. Therefore, even though a given incoming call message may contain calling party number information, it may not be reliable enough to positively determine if the incoming call is a looped call. Accordingly, it is not possible to positively identify any given call as a looped call at this point.

However, the present invention does not require positively identifying an incoming call as being a looped call, but rather, attempts only to determine if a given incoming call is a possible looped call. If there are previously received calls waiting for the subscriber, and the optional parameter check of step 154 reveals possible duplicate calling or called party numbers, then the incoming call is identified by the call control function 18 as a possible looped call. That is, the incoming call may or may not be a looped call of a previously received call, and as such, is placed on the pending call list (box 160) to wait. The present invention does not originate any outbound call legs, but instead, purposefully delays forwarding the incoming call to the called number. This wait or delay in forwarding the call permits the present invention to prevent continuous looped calls.

When the incoming call is placed on the pending call list (box 160), the call control function 18 starts a call timer associated with the incoming call (box 162) as shown in FIG. 4B. The value of the call timer defines a duration that is long enough to ensure that any previous calls already on the pending list have stopped ringing the called number. By way of example, consider a previous call already on the pending list, and an incoming call being placed on the pending list. Further, consider that these two calls have associated call timers $T_0$ and $T_1$, respectively. In one embodiment, the value of $T_1$ is set such that it is slightly longer (e.g., 3 seconds) than the initial value of $T_0$. Thus, if the initial value for $T_0$ is 30 seconds, then $T_1$ would be set to $T_0+3$ seconds, or 33 seconds. In an alternate embodiment, the value $T_1$ is set to be slightly longer than the time remaining on call timer $T_0$. Thus, if the previous call still has 5 seconds left on its associated call timer, the value $T_1$ would be T0+3 seconds, or 8 seconds. However, those skilled in the art will readily appreciate that the value of the call timer may be chosen appropriately with respect to network considerations, and further, may be determined by the system operators, or customized through subscriber provisioning. Alternately, the call timer may be varied dynamically according to the traffic dependent call setup delays.

In addition to starting the call timer, the call control function 18 of the present invention may cause an announcement to be played to the caller, indicating that they are waiting (box 162). In one embodiment, a switch or an intelligent peripheral in the network may play this announcement. Those skilled in the art will appreciate that a caller would hear the announcement played in step 162 if the incoming call is not a looped call. However, if the incoming call is a looped call, there may be no caller on the other end. In these cases, the announcement may simply be played with no one on the other end to hear it.

Calls are removed from the pending call list responsive to an expired timer, or the receipt of a call abandon message (box 164). The abandon message, or disconnect indication, received by the call control function 18 may be generated when the caller hangs up, or when switch 12 sends the call to an "unavailable" destination. In the case where the incoming call is a looped call and the call control function 18 receives an abandon message, the looped call will be removed from the pending call list (box 168). That is, when the caller hangs up the phone or the switch sends the call to the subscriber's "unavailable" destination, the resultant disconnect message will propagate through each leg in the network 10, and terminate existing connections.

If the call timer has expired, the call control function will once again determine if a previously received call to the subscriber is currently being processed or has not yet been answered by the subscriber (box 170). If a call is either being processed or not yet answered by the subscriber, the call control function 18 will send the call whose timer has expired to the "unavailable" destination number provisioned by the subscriber (box 172). This is to prevent long waits for the caller. As described above, the "unavailable" destination number preferably leads to voice mail, for example, or to a number that will not forward a call. Thus, call looping is prevented. However, if no other previously received calls are waiting for the subscriber, the call cannot be a looped call, and may be sent to normal call processing (box 174). These calls can be positively identified as not being looped calls, because any looped calls would have been terminated responsive to the disconnect message received when the calling party hung up, or was sent to the "unavailable" destination number.

Therefore, the present invention prevents call looping by delaying the forwarding of possible looped calls to the called number long enough for any previous calls to be terminated, or answered. This method may be used in various types of networks, and further, may be used to stop call looping in networks that use various types of call forwarding to forward calls. For example, some networks forward calls from phone to phone. That is, first the network rings phone A. If the subscriber does not answer phone A, or phone A is busy, then the network will forward the call to phone B. Other networks employ the simultaneous ringing of a plurality of phones. In these situations, the network rings both phones A and B, and forwards the call if the subscriber fails to answer either phone, or if either phone is busy. Regardless of the type of network or call forwarding used, however, the system and method of the present invention can be used to prevent call looping.

Those skilled in the art will readily appreciate that the present invention may be implemented using either hardware, or software, or both, and further, software implementations may vary using different languages and data structures. In one embodiment, for example, the loop-stopper functionality 120 of the present invention is developed in C/C++, and the pending call list is implemented as a First-In-First-Out (FIFO) queue. However, the present invention is not limited to a specific language and/or class of languages, nor is it limited to any single data structure implantation. Additionally, it should be noted that the present invention prevents call looping on calls where both the calling and the called parties share the same switch, or where the calling and called parties employ a connection that spans multiple switches.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. A method to stop call looping comprising:
   receiving a first call directed to a called number;
   receiving a second call directed to said called number after said first call has been received at said called number;
   determining if said second call is a possible looped call; and
   delaying the forwarding of said second call if said second call is a possible looped call.

2. The method of claim 1 wherein determining if said second call is a possible looped call comprises determining if said first call is ringing said called number.

3. The method of claim 1 wherein determining if said second call is a possible looped call comprises determining if said first call is waiting to ring said called number.

4. The method of claim 1 wherein determining if said second call is a possible looped call comprises checking if said first call is on a list of pending unanswered calls.

5. The method of claim 4 wherein checking if said first call is on a list of pending unanswered calls comprises comparing the calling number of said first call with the calling number of said second call.

6. The method of claim 1 wherein delaying the forwarding of said second call comprises storing information associated with said second call on a list of pending unanswered calls.

7. The method of claim 1 wherein delaying forwarding said second call further comprises starting a call timer associated with said second call.

8. The method of claim 7 further comprising sending said second call to an unavailable destination number upon expiration of said call timer if other pending calls directed to said called number are being processed.

9. The method of claim 7 further comprising removing said second call from a pending call list upon receiving a disconnect indication.

10. A system for stopping looped calls, the system comprising:
    a server operatively connected to a switch; and
    a call control function running on said server, said call control function programmed to:
       determine if an incoming call directed to a called number is a possible looped call of a previous call directed to said called number; and
       delay the forwarding of said incoming call to said called number if said incoming call is a possible looped call of said previous call.

11. The system of claim 10 wherein said call control function is further programmed to determine if said previous call is being processed.

12. The system of claim 11 further comprising memory, and wherein said call control function is further programmed to store information associated with said incoming call in said memory if said previous call is being processed.

13. The system of claim 12 wherein said call control function is further programmed to start a call timer associated with said incoming call in said memory.

14. The system of claim 12 wherein said call control function is further programmed to remove said information associated with said incoming call from said memory if said call control function receives a disconnect indication.

15. The system of claim 13 wherein said call control function is further programmed to send said incoming call to an unavailable destination number upon expiration of said call timer if other pending calls directed to said called number are being processed.

16. The system of claim 10 further comprising a PBX operatively connected to said call control function.

17. A system to stop call looping comprising:
   a call control function programmed to:
      receive a first call directed to a called number;
      receive a second call directed to said called number after said first call is being processed, said second call being a looped call of said first call; and
      delay connecting said second call with said called number.

18. The system of claim 17 wherein said call control function is further programmed to store information associated with said second call on a pending unanswered call list.

19. The system of claim 18 wherein said call control function is further programmed to delete said information from said pending unanswered call list upon receiving a disconnect indication.

20. The system of claim 18 wherein said call control function is further programmed to start a call timer associated with said second call when said call control function stores said information.

21. The system of claim 20 wherein said call control function is further programmed to send said second call to an unavailable destination number upon expiration of said call timer if other pending calls directed to said called number are being processed.

22. A communications network configured to stop call looping, the network comprising:
   a switch for receiving calls;
   a server operatively connected to said switch;
   a call control function running on said server and programmed to:
      determine if an incoming call directed to a called number is a possible looped call of a previous call directed to said called number; and
      delay the sending of a connect message to connect said incoming call with said called number if said incoming call is a possible looped call of said previous call.

23. The communications network of claim 22 wherein said call control function is further programmed to remove said incoming call from a pending unanswered call list upon receiving a disconnect indication.

24. The communications network of claim 22 wherein said call control function is further programmed to send said incoming call to said called number if said previous call is not being processed.

25. The communications network of claim 22 further comprising a PBX operatively connected to said call control function.

26. A method to stop call looping comprising:
   receiving a first call directed to a called number;
   receiving a second call directed to said called number after said first call has been received at said called number;
   delaying the forwarding of said second call to said called number if said second call is a possible looped call.

* * * * *